Patented Apr. 28, 1942

2,280,794

UNITED STATES PATENT OFFICE 2,280,794

PURIFICATION OF TETRACHLORETHYLENE

Oliver W. Cass, Niagara Falls, N. Y., assignor to E. I. du Pont de Nemours & Company, Wilmington, Del., a corporation of Delaware No Drawing. Application July 11, 1940, Serial No. 344,871

5 Claims. (Cl. 202—57)

This invention relates to a method for purifying and stabilizing tetrachlorethylene. More particularly, it relates to a method for removing from tetrachlorethylene certain other chlorinated hydrocarbons usually associated therewith, notably 1,1,2-trichlorethane and asymmetrical (1,1,1,2) tetrachlorethane, which tend to impair the stability of tetrachlorethylene and to restrict its industrial applications.

Tetrachlorethylene is one of the more important chlorinated hydrocarbon solvents which have come into extensive use within the past few years. It is an excellent solvent for oils and greases and, when pure, possesses a high degree of stability and resistance to the action of heat, light, oxygen, water, etc. There are several known methods for preparing tetrachlorethylene, one of the most important of which utilizes acetylene and chlorine as the basic raw materials. In this process, acetylene is chlorinated to form tetrachlorethane, which, in turn, is converted by dehydrochlorination to trichlorethylene. The trichlorethylene is then chlorinated to form pentachlorethane, and finally the latter compound is dehydrochlorinated to form tetrachlorethylene. These reactions are represented by the following equations:

1. $CH \equiv CH + 2Cl_2 \rightarrow CHCl_2CHCl_2$
2. $CHCl_2CHCl_2 \rightarrow CHCl = CCl_2 + HCl$
3. $CHCl = CCl_2 + Cl_2 \rightarrow CHCl_2CCl_3$
4. $CHCl_2CCl_3 \rightarrow CCl_2 = CCl_2 + HCl$ In actual practice, however, certain side reactions occur in addition to the principal reactions represented by the above equations. Accordingly, the final product, although predominantly tetrachlorethylene, contains minor proportions of other chlorinated hydrocarbons, such as trichlorethylene (boiling point 87° C.), 1,1,2-trichlorethane (boiling point 114° C.), asymmetrical tetrachlorethane (boiling point 129° C.), pentachlorethane (boiling point 159° C.), and hexachlorethane (boiling point 184° C.). Of these impurities, the majority may be separated from the tetrachlorethylene (boiling point 121° C.) by the usual methods of fractional distillation. Two of the above named compounds, however, asymmetrical tetrachlorethane and 1,1,2-trichlorethane, not only possess boiling points within a few degrees of the boiling point of tetrachlorethylene, but they also tend to form constant boiling mixtures therewith so that it is practically impossible to separate these impurities by the ordinary methods of fractional distillation.

The presence of either asymmetrical tetrachlorethane or 1,1,2-trichlorethane in tetrachlorethylene is decidedly objectionable for the reason that these impurities tend to decompose upon exposure to light, heat, moisture or oxidizing influences with the formation of corrosive, acid decomposition products. I have found, moreover, that when both of these impurities are present together in tetrachlorethylene, their deleterious effect upon the stability of the product far exceeds the effect of either impurity individually. This peculiar synergistic action of combinations of asymmetrical tetrachlorethane and 1,1,2-trichlorethane is strikingly illustrated by the results of stability determinations that I have made upon tetrachlorethylene containing varying amounts of asymmetrical tetrachlorethane and 1,1,2-trichlorethane and mixtures thereof. These stability tests were made by refluxing samples of the tetrachlorethylene with water in the presence of weighed copper strips for a period of sixty hours. A comparison of the acidity and corrosive properties developed under these conditions in the different samples was then made by determining the loss in weight of the copper strips and the amount of 0.01 normal sodium hydroxide solution required to neutralize the acid present in the water layer. The results of these tests are tabulated below:

| | Acidity in water layer | Loss in weight of copper strip |
|---|---|---|
| | | Grams |
| Pure tetrachlorethylene | Nil | 0.0085 |
| Pure tetrachlorethylene, plus 5% asymmetrical tetrachlorethane. | 2.3 cc. 0.01N NaOH per 25 cc. | 0.0266 |
| Pure tetrachlorethylene, plus 5% 1,1,2-trichlorethane. | 7.5 cc. 0.01N NaOH per 25 cc. | 0.0574 |
| Pure tetrachlorethylene, plus 2½% asymmetrical tetrachlorethane and 2½% 1,1,2-trichlorethane. | 195 cc. 0.01N NaOH per 25 cc. | 0.6064 |

The foregoing results show that the sample of tetrachlorethylene containing 2½% asymmetrical tetrachlorethane and 2½% 1,1,2-trichlorethane corroded copper at a rate approximately twenty-three times that of the sample containing 5% asymmetrical tetrachlorethane and ten times that of the sample containing 5% 1,1,2-trichlorethane. Similarly, the acidity developed in the sample containing 2½% each of asymmetrical tetrachlorethane and 1,1,2-trichlorethane amounted to eighty-five times that of the 5% asymmetrical tetrachlorethane sample and 26 times that of the 5% 1,1,2-trichlorethane sample.

It may be mentioned at this point that there are several known commercial methods for preparing tetrachlorethylene other than that mentioned above. For example, this compound may be prepared by the thermal decomposition of carbon tetrachloride or it may be obtained as a by-product in the manufacture of chloroform by the reduction of carbon tetrachloride. Tetrachlorethylene prepared by these methods contains impurities comprising certain oxygen-containing chloro- derivatives, such as phosgene and acid chlorides, the presence of which may be detected by means of a characteristic color reaction with benzidine. Several methods have been proposed for removing impurities of this character from tetrachlorethylene. The present invention, however, is not concerned with impurities of this character, which are not ordinarily present in tetrachlorethylene derived from acetylene and chlorine; it is directed to the removal from tetrachlorethylene of 1,1,2-trichlorethane and asymmetrical tetrachlorethane, compounds which do not give a color reaction with benzidine.

It is, accordingly, an object of the present invention to provide an improved method for purifying and stabilizing tetrachlorethylene. A further object is to provide a method for removing from tetrachlorethylene impurities of the character of 1,1,2-trichlorethane and asymmetrical tetrachlorethane which cannot be readily removed therefrom by ordinary fractional distillation. Still another object of the invention is to provide a simple and efficacious method for purifying tetrachlorethylene which may be carried out in ordinary iron or steel equipment without danger of corroding the same. Other objects and advantages of the invention will be apparent from the ensuing disclosure.

The above objects are attained in accordance with the invention by treating impure tetrachlorethylene containing impurities of the class consisting of 1,1,2-trichlorethane and asymmetrical tetrachlorethane with a strongly alkaline reagent in the presence of water under conditions such that 1,1,2-trichlorethane and/or asymmetrical tetrachlorethane are converted into compounds which may be readily separated from tetrachlorethylene by fractional distillation. I have found that when tetrachlorethylene containing 1,1,2-trichlorethane is treated with an aqueous basic reagent at an elevated temperature the 1,1,2-trichlorethane is substantially completely converted into asymmetrical dichlorethylene (boiling point 32° C.) while, under the same conditions, asymmetrical tetrachlorethane is converted into trichlorethylene (boiling point 87° C.). Since both of these compounds have boiling points widely differing from that of tetrachlorethylene (121° C.) they may be readily separated therefrom by fractional distillation.

In carrying out my purification process it is essential to utilize as the basic reagent a strong base such as a hydroxide of an alkali or an alkaline earth metal. I have found that organic bases and the weaker inorganic bases have little or no effect on these impurities under any feasible operating conditions.

I prefer to use as the basic reagent an aqueous solution of an alkali metal hydroxide such as caustic soda or caustic potash. Thus, for example, refluxing crude tetrachlorethylene for a period of two hours with a 5% aqueous solution of caustic soda suffices to effect a complete conversion of 1,1,2-trichlorethane to asymmetrical dichlorethylene and of asymmetrical tetrachlorethane to trichlorethylene.

In general, aqueous solutions of alkali metal hydroxides having a concentration upward of 1% by weight may be used effectively for this purpose. Also solutions having an alkali hydroxide concentration considerably in excess of 5%, e. g. on the order of 10%, may be used. However, caution must be exercised in using the higher concentrations of the alkali metal hydroxides, especially where very high proportions of tetrachlorethane are initially present in the tetrachlorethylene. This is because of the possibility of further reactions taking place which lead to the formation of dichloracetylene, which is highly explosive. Thus, for example, one mole of asymmetrical tetrachlorethane may react with two moles of sodium hydroxide in accordance with the following equation: 

$$CH_2ClCCl_3 + 2NaOH \rightarrow CCl \equiv CCl + 2NaCl + 2H_2O$$

If any evidences of dichloracetylene being formed are observed, it is desirable to pass a current of air through the refluxing mixture to remove and destroy any of this compound as rapidly as it is formed. In general, however, if the concentration of the alkali metal hydroxide solution employed does not substantially exceed 5%, no difficulties will be encountered from the formation of dichloracetylene.

When utilizing as the basic reagent an alkaline earth metal hydroxide, such as an aqueous lime suspension, it is desirable to use higher concentrations of the basic reagent and to carry out the purification at temperatures in excess of the normal reflux temperature of the reaction mixture. This may be accomplished by carrying out the reaction under super-atmospheric pressure. Thus, an aqueous suspension of lime containing on the order to 20% $Ca(OH)_2$ may be used for the purification without any danger of forming dichloracetylene. However, if the purification is carried out at ordinary reflux temperatures the reflux period required for effective conversion of the impurities is excessive for ordinary industrial use. For example, in one instance a reflux period of 80 hours was required for complete conversion of the impurities. But by carrying out the reaction under pressure in an autoclave, complete conversion of the impurities was obtained in eight hours at a temperature of 150° C. or in sixteen hours at a temperature of 120° C.

The invention may be illustrated by the following specific examples.

*Example 1*

A sample of crude tetrachlorethylene containing as impurities 1,1,2-trichlorethane and asymmetrical tetrachlorethane was refluxed for two hours with one-half its volume of 5% aqueous caustic soda solution. At the end of this period the tetrachlorethylene was steam-distilled, separated from the water layer, dried and fractionated. The constant boiling tetrachlorethylene fraction was then tested for stability according to procedure previously described, a comparative test being made with a sample of the original material. The results obtained were as follows:

|  | Acidity in water layer | Loss in weight of copper strip |
|---|---|---|
| Untreated sample | 178 cc. of 0.01N NaOH per 25 cc. | Grams 0.5018 |
| Treated sample | 0.6 cc. of 0.01N NaOH per 25 cc. | 0.0064 |

As indicated by the above results, the treated sample showed an excellent degree of stability and had substantially no corrosive action on copper in the presence of water under reflux conditions.

*Example 2*

Another similar sample of perchlorethylene was heated under pressure with one-half its volume of 20% aqueous lime slurry for twelve hours at 150° C., steam distilled, separated, dried, and fractionated. The constant boiling perchlorethylene fraction was tested for stability as in Example 1, and found to be very stable, as indicated by the following results:

|  | Acidity in water layer | Loss in weight of copper strip |
|---|---|---|
| Untreated sample | 110 cc. 0.01N NaOH per 25 cc. | Grams 0.2493 |
| Treated sample | Nil | 0.0062 |

The procedure of the present invention has several advantages over methods proposed heretofore for the removal of impurities from tetrachlorethylene. It is very effective in removing completely the compounds 1,1,2-trichlorethane and asymmetrical tetrachlorethane, which are primarily responsible for instability of commercial tetrachlorethylene prepared from acetylene. The reagents employed are relatively inexpensive, and the process may be carried out at moderate temperatures and in conventional equipment of iron or steel construction. In the latter respect, the method of the invention has decided advantages over purification methods involving reactions wherein hydrogen chloride is evolved, thereby necessitating the use of acid-proof equipment. Moreover, the trichlorethylene and dichlorethylene produced in my purification process may be economically recovered as valuable by-products.

It is to be understood that the invention is not restricted to the specific embodiments thereof described hereinabove, but includes all such modifications, variations and equivalents as fall within the scope of the appended claims.

I claim:

1. The method of removing from tetrachlorethylene impurities of the class consisting of 1,1,2-trichlorethane and asymmetrical tetrachlorethane which comprises treating the impure tetrachlorethylene with a hydroxide of a metal selected from the alkali and alkaline earth groups in the presence of water at an elevated temperature, the duration of the treatment, the concentration of the metal hydroxide and the reaction temperature being sufficient to cause the said impurities to react with said metal hydroxide, and fractionating the mixture to separate purified tetrachlorethylene therefrom.

2. The method of removing from tetrachlorethylene impurities of the class consisting of 1,1,2-trichlorethane and asymmetrical tetrachlorethane which comprises refluxing the impure tetrachlorethylene with a hydroxide of a metal selected from the alkali and alkaline earth groups in the presence of water, the duration of the treatment, the concentration of the metal hydroxide and the reaction temperature being sufficient to cause the said impurities to react with said metal hydroxide, and distilling the mixture to separate purified tetrachlorethylene therefrom.

3. A method of removing from tetrachlorethylene impurities of the class consisting of 1,1,2-trichlorethane and asymmetrical tetrachlorethane which comprises refluxing the impure tetrachlorethylene with an aqueous solution of an alkali metal hydroxide of a concentration sufficient to react with said impurities, and distilling the mixture to separate purified tetrachlorethylene therefrom.

4. A method of removing from tetrachlorethylene impurities of the class consisting of 1,1,2-trichlorethane and asymmetrical tetrachlorethane which comprises refluxing the impure tetrachlorethylene with an aqueous solution of sodium hydroxide of about 1% to about 10% concentration, and distilling the mixture to separate purified tetrachlorethylene therefrom.

5. The method of removing from tetrachlorethylene impurities of the class consisting of 1,1,2-trichlorethane and asymmetrical tetrachlorethane which comprises admixing the impure tetrachlorethylene with an aqueous suspension of calcium hydroxide of a concentration sufficient to react with said impurities, heating the mixture under super-atmospheric pressure to a temperature exceeding the atmospheric boiling point of the mixture, and thereafter distilling the mixture to separate purified tetrachlorethylene therefrom.

OLIVER W. CASS.